(12) United States Patent
Smith

(10) Patent No.: US 6,888,124 B1
(45) Date of Patent: May 3, 2005

(54) METHOD TO MONITOR INTERNAL PARAMETERS OF ELECTRICAL MOTOR SYSTEMS

(75) Inventor: David Randolph Smith, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/533,471

(22) Filed: Mar. 23, 2000

Related U.S. Application Data

(60) Provisional application No. 60/125,857, filed on Mar. 24, 1999.

(51) Int. Cl.[7] .................................................. G01J 1/04
(52) U.S. Cl. ................................................ 250/227.14
(58) Field of Search ....................... 250/227.14, 227.15, 250/227.16, 227.17, 227.18, 227.19, 554, 231.19, 573; 73/35.01, 35.06, 35.09, 35.12, 116; 385/12; 340/578

(56) References Cited

U.S. PATENT DOCUMENTS

| | | | |
|---|---|---|---|
| 4,370,098 A | * | 1/1983 | McClain et al. .............. 417/18 |
| 4,379,226 A | * | 4/1983 | Sichling et al. .......... 250/231.1 |
| 4,827,487 A | | 5/1989 | Twerdochlib ................ 374/152 |
| 4,901,070 A | | 2/1990 | Vandevier ................. 340/853.2 |
| 4,935,507 A | | 6/1990 | Takaya et al. .............. 540/222 |

FOREIGN PATENT DOCUMENTS

| | | |
|---|---|---|
| DE | 29503853u | 9/1995 |
| FR | 1120900 | 1/1957 |
| GB | 767383 | 7/1956 |
| JP | 55122451 | 9/1980 |

\* cited by examiner

*Primary Examiner*—Edward J. Glick
*Assistant Examiner*—Courtney Thomas

(57) ABSTRACT

There is provided a process and apparatus for measuring and monitoring motor systems, which includes providing a motor system having at least one component selected from a stator and an armature, which at least one component is connected to at least one electrical wire incorporating at least one means for data measurement, collecting data with the means for data measurement, and transferring the collected data to a data collection station.

7 Claims, 2 Drawing Sheets

METHOD TO MONITOR INTERNAL PARAMETERS OF ELECTRICAL MOTOR SYSTEMS

This application claims the benefit of U.S. Provisional Application No. 60/125,857 filed Mar. 24, 1999, the entire disclosure of which is hereby incorporated by reference

FIELD OF THE INVENTION

This invention relates to an improved process to measure and monitor conditions of electrical motor systems, particularly submersible motor systems, using a deployment of optic fibers, sensors, and micro-machines wound integrally with the electrical wire used in the construction of an electrical motor's stator or armature.

BACKGROUND OF THE INVENTION

It is often useful from both a design and development prospective as well for operational control, safety, and extending motor life, to monitor certain internal parameters of an electric motor. Electrical motor performance and life cycle are functions of internal conditions. However, monitoring the internal parameters of electrical motors has not, in the past, been commonly done and is particularly difficult on motors which function in fairly inaccessible locations, such as those used subsurface or subsea during oil and gas operations.

SUMMARY OF THE INVENTION

The present invention solves the problem of monitoring internal electrical motor parameters. To this end there is provided a process for measuring and monitoring motor systems, said process comprising:

providing a motor system having at least one component selected from a stator and an armature, said at least one component connected to at least one electrical wire;

incorporating at least one means for data measurement with said at least one electrical wire;

collecting data with said at least one means for data measurement; and transferring said collected data to a data collection station.

DETAILED DESCRIPTION

Figure 1:
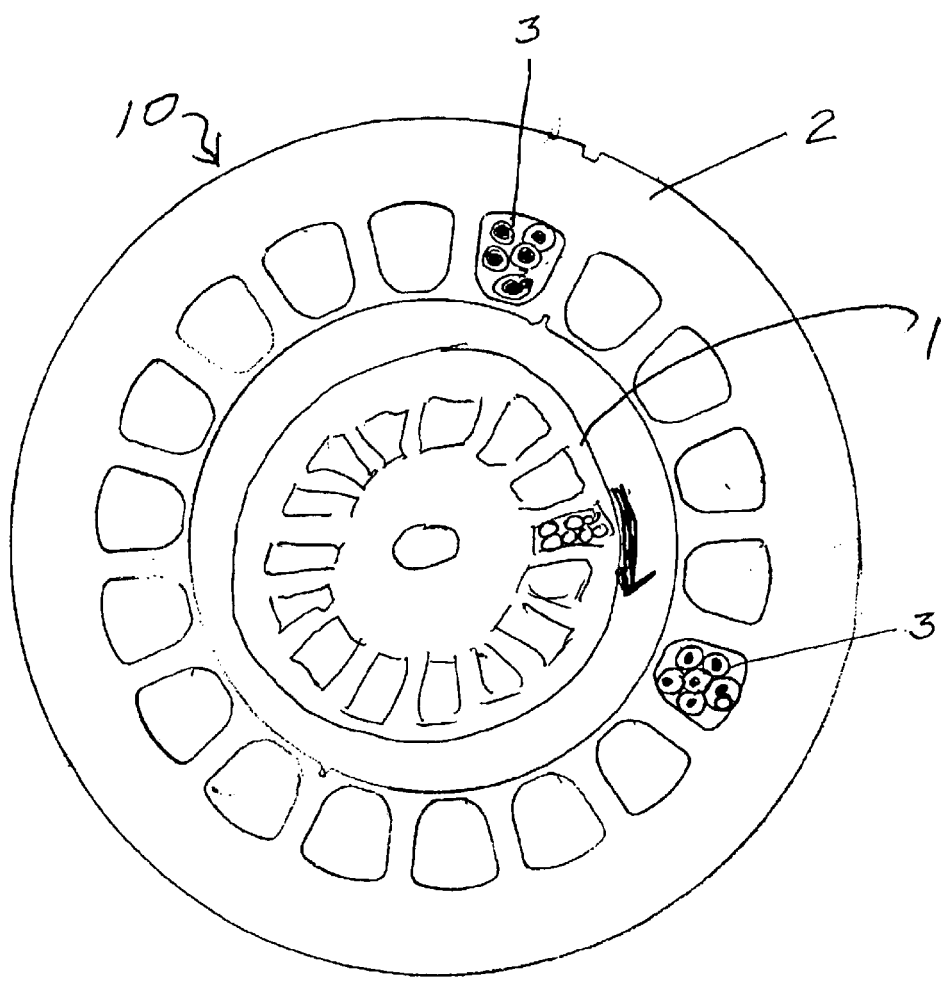
FIG. 1 is a schematic cross-sectional view of an electrical motor having a stator with electrical wires of which at least one wire is equipped with a fiber optical sensor system embedded in the insulation.

It is often useful from both a design and development prospective as well for operational control, safety, and extending motor life, to monitor certain internal parameters of an electric motor. The process of the invention allows parameters to be measured along multiple nodes along the axis of the motor as well as at different radial positions in the motor. These variables give useful insight to heat rise, heat flux, hot spots, and the subsequent heat profiles in different motor designs, as well as offering an intimate knowledge of the motors internal conditions of pressure and vibration, and stator movement under during actual running and operation of the electrical system.

Monitoring of the internal conditions of an electrical motor allows electrical motor performance and life cycle to be increased. Further, the monitoring process allows for improvements and or changes in design and operations to be made and then confirmed via the internal monitoring offered by this invention.

The most direct application of this technology is in the development of electrical motors, particularly for subterranean oil and gas wells, which exhibit higher reliability, greater efficiency. Many internal parameters may be measured. For example, it is often very useful to monitor the internal vibration of an electrical motor in operations to detect poor dampening in the system, poor alignment of the motor rotor, or vibrations induced by start ups or implements and devices attached to the motors (e.g., compressors, fans, pumps, etc). Electronic communications, whether optical or otherwise, may also be passed through an electrical motor from outside the electrical motor.

The process of the invention comprises providing a motor system having at least one component selected from a stator and an armature, and at least one means for data measurement. Means for measuring data useful in the process of the invention include optic fibers, sensors, micro-machines, and combinations thereof. Data is collected from the data measurement means and transferred to a data collection station. When optic fibers arm used, the fibers become both the means for measuring data and a means for transferring the data to the collection station. If the motor is subsurface or subsea, the data collection station could be at the surface or above the surface of the sea.

The at least one means for data measurement needs to be associated with the at least one motor component. In one embodiment the at least one motor component is connected to at least one electrical wire to which the data measurement means is connected or incorporated. In a preferred embodiment, the at least one means for data measurement is incorporated with the at least one electrical wire. This may be accomplished, for example, by wrapping optic fiber and sensors familiar to those in the art of telemetry around the electrical wire and then encapsulating and attaching the optic fiber to the wire by covering or coating the electrical wire and the optic fiber with an insulation material. For example, an optic fiber and sensors, machines, and devices may be wound longitudinally along the length of the electric wire. The two may then be wound through the electric motor stator slots to form the stator windings of the motor. The stator may then have insulation applied to it and the electric wires through varnishing, epoxy coating, or any of the other insulation techniques used by those familiar to the art of making motors. The curing temperature of the insulation materials may also be closely monitored by using the data measurement means as an intrinsic temperature monitor. For example, if the data measurement means is an optic fiber, optical time domain reflectometry techniques and Raman backscattering may be used.

In another embodiment of the invention, the optic fiber and the associated devices for monitoring may be placed in a tube which is wound in the stator of the electrical motor with the electrical wire.

Another embodiment uses optic fiber, wound around electrical wire and passed through the stator, to be a communication path between sensors out side of the electric motor.

Figure 2:
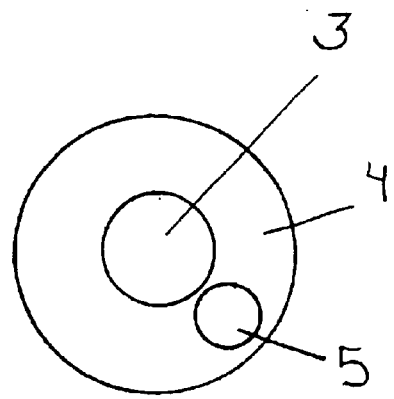
FIG. 2 shows a cross-sectional view of the wire with fiber optical sensor system of FIG. 1.
Figure 3:
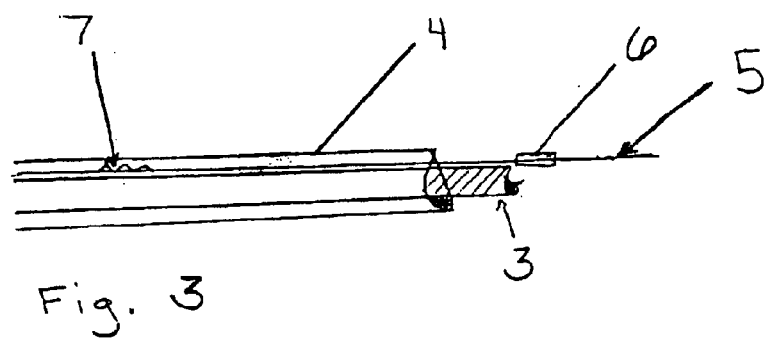
FIG. 3 shows a longitudinal sectional view of the wire and fiber optical sensor system of FIG. 1.

The invention will be described in more detail with reference to the Figures. Referring to FIG. 1 there is shown an electrical motor 10 having a center rotor 1 and a stator 2 which comprises a series of electrical wires 3 that are wound such that when an electrical current passes through the wires 3 a rotating electromagnetic field is created which induces the rotor to rotate relative to the stator 2. As shown in FIG. 2 and FIG. 3, at least one wire 3 has an electrical insulation coating 4 in which a fiber optical cable 5 is embedded, which cable 5 may be provided with suitable microsensors 6, such as an accelerometer to detect vibrations, and/or optic gratings, such as fiber bragg gratings 7 that reflect light of a wavelength equal to the grating width and allow light of other wavelengths to pass through the cable 7. The gratings 7 may be designed such that the reflected wavelength varies with temperature such that the fiber optical cable 5 forms an elongate string of miniature thermometers along the length of the wire 3. Likewise the optic sensors 6 may be formed by seismic sensors which are formed by similar gratings that reflect varying wavelengths in response to vibrations so that the fiber optical cable 5 is an elongate multi-parameter sensor system that accurately detects any overheating and/or vibrations, for example when the associated pump is blocked or runs dry or when a bearing has worn out.

While this invention has been described in detail for the purposes of illustration, it is not to be construed as limited thereby but is intended to cover all changes and modifications within the spirit and scope thereof.

I claim:

1. A process for measuring and monitoring motor systems, said process comprising:

providing a motor system having at least one component selected from a stator and an armature, said at least one component connected to at least one electrical wire;

incorporating at least one fiber optical cable with said at least one electrical wire, the fiber optical cable is provided with at least one physical parameter sensor and is embedded in an electrical insulation coating surrounding at least one electrical wire;

measuring a physical parameter using the physical sensor;

collecting the measured physical parameter as collected data with said at least one fiber optical cable;

transferring said collected data to a data collection station; and monitoring the collected data.

2. A process according to claim 1 wherein said fiber optical cable is encapsulated and attached to said electrical wire by covering or coating the electrical wire and the fiber optical cable with an insulation material.

3. A process for measuring and monitoring motor systems, said process comprising:

providing a motor system having at least one motor component selected from a stator and an armature, said at least one component connected to at least one electrical wire;

providing at least one means for data measurement wherein said means for data measurement comprises a fiber optical cable;

connecting said at least one means for data measurement with said at least one motor component;

collecting data with said at least one means for data measurement; and transferring said collected data to a data collection station.

4. A process according to claim 3 wherein said means for measuring data is contained within a tube.

5. A process according to claim 4 wherein said motor component is a stator and said tube is wound in said stator with said electrical wire.

6. An apparatus for measuring and monitoring motor systems comprising:

a motor system having at least one motor component selected from a stator and an armature, said at least one component connected to at least one electrical wire;

a fiber optical cable wound around said electrical wire;

means for measuring and collecting data with said fiber optical cable; and means for communicating said data to at least one sensor located outside said motor wherein the sensor can use the data to monitor the motor system.

7. The apparatus according to claim 6 wherein the fiber optical cable is encapsulated and attached to said electrical wire by covering or coating the electrical wire and the fiber optical cable with an insulation material.

* * * * *